US008005870B1

(12) United States Patent
Bedell et al.

(10) Patent No.: US 8,005,870 B1
(45) Date of Patent: Aug. 23, 2011

(54) SYSTEM AND METHOD FOR SYNTAX ABSTRACTION IN QUERY LANGUAGE GENERATION

(75) Inventors: Jeffrey A. Bedell, Arlington, VA (US);
Yinong Chen, Sterling, VA (US);
Benjamin Z. Li, Great Falls, VA (US);
Fabrice Martin, Washington, DC (US);
Sadanand Sahasrabudhe, McLean, VA (US); Jun Yuan, Sterling, VA (US)

(73) Assignee: Microstrategy Incorporated, McLean, VA (US)

( * ) Notice: Subject to any disclaimer, the term of this patent is extended or adjusted under 35 U.S.C. 154(b) by 2521 days.

(21) Appl. No.: 09/883,302

(22) Filed: Jun. 19, 2001

(51) Int. Cl.
*G06F 17/30* (2006.01)
*G06F 17/00* (2006.01)

(52) U.S. Cl. .......................................... 707/802; 706/45
(58) Field of Classification Search .................. 707/2, 3, 707/102, 104.1
See application file for complete search history.

(56) References Cited

U.S. PATENT DOCUMENTS

| | | | |
|---|---|---|---|
| 4,506,326 A | 3/1985 | Shaw | |
| 4,688,195 A | 8/1987 | Thompson | |
| 4,829,423 A | 5/1989 | Tennant | |
| 4,839,853 A | 6/1989 | Deerwester | |
| 4,931,935 A | 6/1990 | Ohira | |
| 5,197,005 A | 3/1993 | Shwartz | |
| 5,276,870 A | 1/1994 | Shan | |
| 5,386,556 A | 1/1995 | Hedin | |
| 5,418,943 A | 5/1995 | Borgida | |
| 5,421,008 A | 5/1995 | Banning | |
| 5,555,403 A | 9/1996 | Cambot et al. | |
| 5,584,024 A | 12/1996 | Shwartz | |
| 5,664,173 A * | 9/1997 | Fast | 707/4 |
| 5,664,182 A | 9/1997 | Nierenberg | |
| 5,692,181 A | 11/1997 | Anand | |
| 5,806,059 A * | 9/1998 | Tsuchida et al. | 707/2 |
| 5,813,005 A * | 9/1998 | Tsuchida et al. | 707/10 |
| 5,864,856 A | 1/1999 | Young | |
| 5,914,878 A | 6/1999 | Yamamoto | |
| 5,918,232 A | 6/1999 | Pouschine | |
| 6,101,495 A * | 8/2000 | Tsuchida et al. | 707/4 |
| 6,154,766 A | 11/2000 | Yost | |
| 6,192,359 B1 * | 2/2001 | Tsuchida et al. | 707/4 |
| 6,212,516 B1 * | 4/2001 | Kobayashi et al. | 1/1 |

(Continued)

OTHER PUBLICATIONS

Robert C. Stern, Bruce M. Anderson and Craig W. Thompson, A Menu-Based Natural Language Interface To a Large Database, Texas Instruments Incorporated, P. O. Box 660246, MS 238, Dallas, Texas 75266, NAECON: National Aerospace & Electronics Conference, Dayton Ohio, May 20-24, 1985.

(Continued)

*Primary Examiner* — Tarek Chbouki
(74) *Attorney, Agent, or Firm* — Hunton & Willliams, LLP

(57) ABSTRACT

A system and method for syntax abstraction in query language generation in an online analytical processing system, a business intelligence system, a reporting system, or a data mining system. The system generates one or more query language statements that can be run against one or more data sources to return a desired data result set. The system includes a syntax pattern selector module and a statement assembly module. The syntax pattern selector module selects a syntax pattern corresponding to a desired function and a syntax standard. The statement assembly module populates the syntax pattern with an argument data set associated with the desired data set. The result is the generation of one or more query language statements with the correct function, syntax, and data parameters to return the desired data result set from the data sources. A method and medium having processor readable code therein are also described.

24 Claims, 4 Drawing Sheets

U.S. PATENT DOCUMENTS

| | | | |
|---|---|---|---|
| 6,247,008 B1 | 6/2001 | Cambot | |
| 6,269,359 B1* | 7/2001 | Sekine | 707/2 |
| 6,279,033 B1 | 8/2001 | Selvarajan | |
| 6,289,352 B1* | 9/2001 | Proctor | 707/102 |
| 6,405,207 B1* | 6/2002 | Petculescu et al. | 707/102 |
| 6,442,557 B1* | 8/2002 | Buteau et al. | 707/102 |
| 6,473,750 B1* | 10/2002 | Petculescu et al. | 707/3 |
| 6,490,593 B2* | 12/2002 | Proctor | 707/102 |
| 6,523,172 B1* | 2/2003 | Martinez-Guerra et al. | 717/143 |
| 6,556,988 B2* | 4/2003 | Tsuchida et al. | 707/3 |
| 6,635,089 B1* | 10/2003 | Burkett et al. | 715/235 |
| 6,678,674 B1* | 1/2004 | Saeki | 707/3 |
| 6,968,553 B1* | 11/2005 | Theeten | 719/311 |
| 7,165,064 B2* | 1/2007 | Saeki | 707/3 |
| 2001/0014888 A1* | 8/2001 | Tsuchida et al. | 707/2 |
| 2001/0020255 A1* | 9/2001 | Hofmann et al. | 709/318 |
| 2002/0032740 A1* | 3/2002 | Stern et al. | 709/206 |
| 2002/0087516 A1* | 7/2002 | Cras et al. | 707/2 |
| 2004/0039730 A1* | 2/2004 | Saeki | 707/2 |
| 2005/0166209 A1* | 7/2005 | Merrick et al. | 719/310 |

OTHER PUBLICATIONS

Harry R. Tennant, Kenneth M. Ross, Richard M. Saenz, Craig W. Thompson, and James R. Miller, Computer Science Laboratory, Central Research Laboratories, Texas Instruments Incorporated, Dallas, Texas, 21st Annual Meeting of the Association for Computatiional Linguistics, MIT, Jun. 1983, pp. 151-158.

Harry R. Tennant, Member, IEEE, Roger R. Bate, Member, IEEE, Stephen M. Corey, Lawrence Davis, Paul Kline, LaMott G. Oren, Malipatola Rajinikanth, Richard Saenz, Daniel Stenger, Member, IEEE, and Craig W. Thompson, Software Innovations for the Texas Instruments Explorer Computer, Proceedings of the IEEE, vol. 73, No. 12, Dec. 1985.

Craig W. Thompson, Kenneth M. Ross, Harry R. Tennant and Richard M. Saenz, Building Usable Menu-Based Natural Language Interfaces to Databases, Proceedings of the Ninth International Conference on Very Large Data Bases, Florence, Italy, Oct. 31-Nov. 2, 1983, pp. 43-55.

Craig W. Thompson, John Kolts, and Kenneth W. Ross, A Toolkit for Building "Menu-Based Natural Language" Interfaces, Texas Instruments Incorporated, P. O. Box 226015, MS 238, Dallas, Texas 75265, 1985.

Craig Warren Thompson, M.A., B.A., Using Menu-Based Natural Language Understanding to Avoid Problems Associated with Traditional Natural Language Interfaces to Databases, Dissertation Presented to the Faculty of the Graduate School of The University of Texas at Austin, May 1984.

GIS/LIS'88 Proceedings accessing the world, vol. 2 pp. 741-750.

Blum (1987)=Blum, Diamond, Hammon, Perkins, and Semmel, "An Intelligent Navigational Assistant for a Decision Resource Database," Proceedings of the Third Annual Expert Systems in Government Conference, pp. 19-25 (1987).

Blum (1988)=Blum, Semmel & Sigillito, "Navigating through Complex Databases: A Case Study," Application of Artificial Intelligence to Command & Control Systems, pp. 380-396 (1988).

1990 Brio DataPrism Reference Manual, Version 1.0 for Apple Macintosh Computers.

1991 Brio DataPrism Reference Manual Update, Version 1.1 for Apple Macintosh Computers.

1990 Brio DataPrism User's Guide, Version 1.1 Update for Apple Macintosh Computers.

1991 Brio DataPrism Update, Version 1.7 for Apple Macintosh Computers.

1987 Metaphor Query Tutorial.

1988 Workstation Tools Training, Metaphor.

1989 Metaphor Database Administration, Release 9.0.

1989 Metaphor Database Administration DBA Tool.

1990 Metaphor Query Tutorial.

Bipin C. Desai et al., "A portable natural language interface," AFIPS Conference Proceedings, vol. 56, 1987, National Computer Conference, pp. 53-58.

Arthur J. Benjamin et al., "A visual Tool for Managing Relational Databases," IEEE Int. Conference on Data Engineering, 1986, pp. 661-668.

X. Wu et al., "KDA: A Knowledge-based Database Assistant," Proceedings Fifth International Conference on Data Engineering, 1989, pp. 402-409.

G. Jakobson et al., "An Intelligent Database Assistant," IEEE Expert, 1986, pp. 65-79.

Tadao Ichikawa et al., "ARES: A Relational Database with the Capability of Performing Flexible Interpretation of Queries," IEEE Transactions on Software Engineering, vol. SE-12, No. 5, May 1986, pp. 624-634.

I. Androutsopoulos et al., "Natural Language Interfaces to Databases—An Introduction," arXiv:cmp-Ig/9503013, vol. 2, Mar. 16, 1995, pp. 1-50.

Eva M. Mueckstein, "Semantic interpretation of a database query language," Data & Knowledge Engineering 1, 1985, pp. 123-138.

S. L. Booth et al., "A Robust Natural Language Interface to a Decision Support System," Conference on Software Tools, 1985, pp. 229-236.

Richard Hull et al., "Semantic Database Modeling: Survey, Applications and Research Issues," ACM Computing Surveys, vol. 19, No. 3, Sep. 1987, pp. 201-260.

Michael D. Gould et al., "Spatial Decision Support Systems: A Bibliography," National Center for Geographic Information and Analysis, Technical Paper 919, Jun. 1991, 17 pages.

* cited by examiner

SYSTEM AND METHOD FOR SYNTAX ABSTRACTION IN QUERY LANGUAGE GENERATION

FIELD OF THE INVENTION

The invention relates to the field of query language generation for data retrieval and processing in a business intelligence, on-line analytical processing, or reporting system.

BACKGROUND OF THE INVENTION

The ability to act quickly and decisively in today's increasingly competitive marketplace is critical to the success of any organization. The volume of data that is available to organizations is rapidly increasing and frequently overwhelming. The availability of large volumes of data presents various challenges. One challenge is to avoid inundating an individual with unnecessary information. Another challenge is to ensure all relevant information is available in a timely manner.

One known approach to addressing these and other challenges is known as data warehousing. Data warehouses, relational databases, and data marts are becoming important elements of many information delivery systems because they provide a central location where a reconciled version of data extracted from a wide variety of operational systems may be stored. As used herein, a data warehouse should be understood to be an informational database that stores shareable data from one or more operational databases of records, such as one or more transaction-based database systems. A data warehouse typically allows users to tap into a business's vast store of operational data to track and respond to business trends that facilitate forecasting and planning efforts. A data mart may be considered to be a type of data warehouse that focuses on a particular business segment.

Decision support systems have been developed to efficiently retrieve selected information from data warehouses. One type of decision support system is known as an on-line analytical processing system ("OLAP"). In general, OLAP systems analyze the data from a number of different perspectives and support complex analyses against large input data sets.

OLAP systems may retrieve and process data from one or more data warehouses or data marts. The data warehouses or data marts may include one or more relational databases. A relational database may include one or more data sources arranged in tables. The tables may be interrelated based upon keys, such as primary keys and foreign keys. Generally, a key is one or more columns in a table that may be used to designate, locate, and retrieve data related to a unique entity. The columns, data types, arrangement of tables, and relationships among tables may be referred to as a database schema.

The databases within the data warehouses or data marts may include a database management system (DBMS) for governing manipulation of data within the databases. Some example DBMS products include Oracle™, Informix™, DB2 (Database 2), Sybase™, Microsoft SQL Server™, Microsoft Access™, and others. Each DBMS may include different methods for accessing and manipulating the data within the databases. Each DBMS may define a query language for accessing and manipulating data within the databases associated with that DBMS. For example, many commercially available DBMS utilize Structured Query Language (SQL). While SQL provides a common ground among many DBMS, implementation of SQL is by no means standard. Each DBMS includes variations in SQL query syntax, such as variable type definitions, naming restrictions, enhanced functions and calculations, shortcuts, defaults, and other features. Additionally, each DBMS may support different syntax for navigating the access and security features associated with the associated databases.

A given OLAP system may handle interactions with a variety of DBMS simultaneously (such as when a single data warehouse includes multiple databases and DBMS from multiple vendors) or as a matter of compatibility with multiple competing DBMS. In addition, many DBMS providers continually upgrade their products, providing new release versions that may include new enhanced features, syntax variations, and optimizations. New DBMS systems may be developed and incorporated into data warehouses and data marts. It may be desirable for OLAP systems to support these new DBMS. All of these variations among DBMS providers and releases may impact the generation of query execution plans and related query structures and query language statements in the OLAP systems.

OLAP systems themselves may incorporate revisions to the generation of query execution plans and related query structures and query language statements. Designers of OLAP systems may identify ways of altering the generation of query execution plans to enhance the performance of data retrieval and processing. Such improvements may be particularly prevalent in response to enhancements in DBMS or following optimization evaluations of existing DBMS features.

Prior OLAP systems may incorporate hard coded query language syntax for handling a variety of DBMS query language syntax and optimizations. Prior OLAP systems may include rules for generating query language statements that are inflexible and difficult to modify. Similar drawbacks exist in other business intelligence and reporting systems.

These and other drawback exist with regard to prior business intelligence, OLAP, and reporting systems.

SUMMARY OF THE INVENTION

The embodiments of the invention may overcome these and other drawbacks of prior business intelligence, OLAP, and reporting systems. Specifically, the embodiments of the invention may provide flexibility and an enhanced ability to update, supplement, or otherwise modify rules for generating query language statements. The embodiments of the invention provide an improved query generation system and method. The improved query generation system and method may facilitate compatibility with multiple DBMS and may allow modifications to the query generation rules to be implemented more efficiently. The improved query generation system and method may be important when a business intelligence system, OLAP, or reporting system is expected to easily incorporate changes and upgrades in data source DBMS and query optimization or efficiency improvement techniques. The embodiments of the invention may prevent expensive downtime for mission critical business intelligence, OLAP, and reporting systems, such as those supporting large sales forces, financial institutions, or other knowledge driven enterprises.

One aspect of the embodiments of the invention is a system for generating a query language statement. The system includes a syntax pattern selector and a statement assembly module. The syntax pattern selector module selects a syntax pattern corresponding to a desired function and a syntax standard. The statement assembly module populates the syntax pattern with an argument data set associated with a desired data set. The system assembles one or more query language statements that may be run against a data source to return the desired data set.

Another aspect of the embodiments of the invention is a method of generating a query language statement to be run against a data source. The method includes the steps of selecting a syntax pattern and populating the syntax pattern. The syntax pattern selected corresponds to a desired function and a syntax standard. The syntax pattern is populated with an argument data set associated with a desired data set from the data source. The populated syntax pattern is a query language statement that may be run against the data source to return the desired data set.

Still another aspect of the embodiments of the invention is a medium having a processor readable program code embodied therein for generating a query language statement. The medium includes code for causing the processor to identify a functional element corresponding to a desired function. The medium also includes code for causing the processor to identify an argument data set associated with a desired data set and the identified functional element. The medium also includes code for causing the processor to select a syntax pattern corresponding to the functional element. Finally, the medium includes code for causing the processor to populate the selected syntax pattern with the identified argument data set to assemble at least one query language statement to be run against a data source.

Other objects and advantages of the present invention will be apparent to one of ordinary skill in the art upon reviewing the detailed description of the present invention.

DETAILED DESCRIPTION OF THE INVENTION

Figure 1:
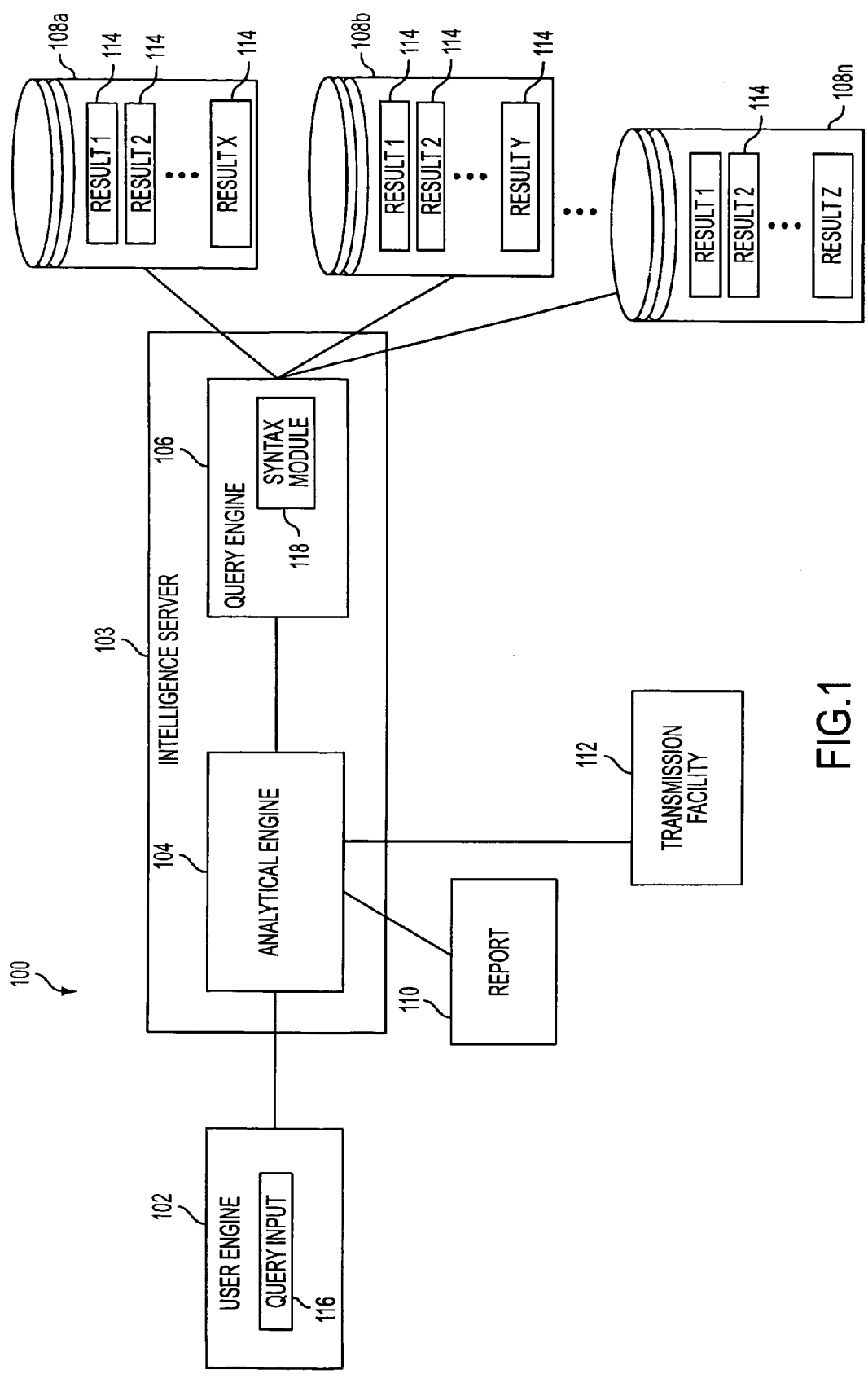
FIG. 1 is a block diagram illustrating an architecture for a system according to an embodiment of the invention.
Figure 2:
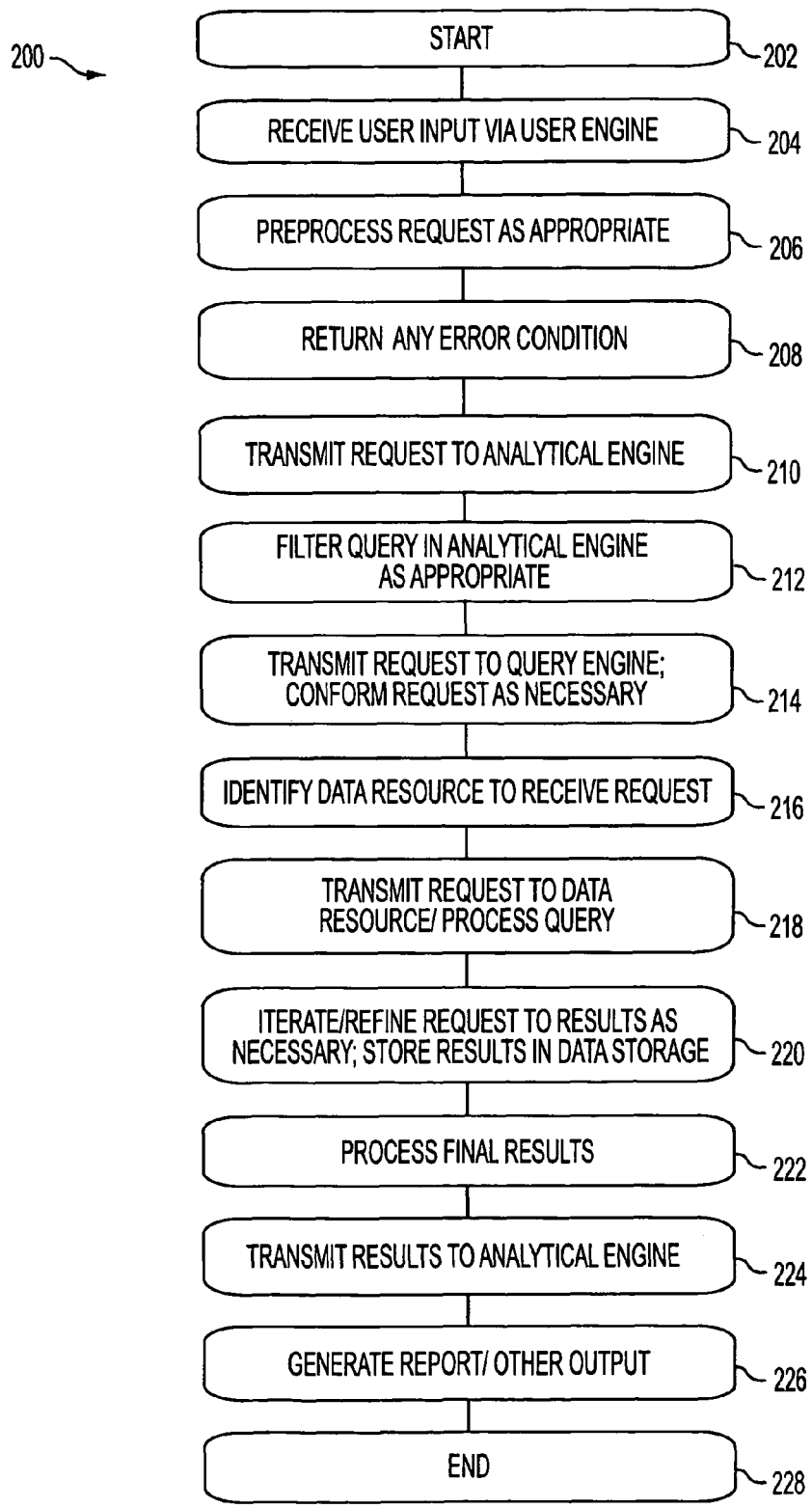
FIG. 2 is a flowchart illustrating steps performed by a process utilizing a query engine according to an embodiment of the invention.

While the present invention relates to data retrieval and processing optimization in an OLAP system, a brief discussion of one embodiment of an OLAP system in which the present invention may be used is shown in FIGS. 1 and 2.

FIG. 1 is a block diagram illustrating a system 100 by which a variety of data resources may be accessed for business analytic, report generation and other intelligence purposes according to an embodiment of the invention. According to a preferred embodiment, the system 100 may comprise an Online Analytical Processing (OLAP) decision support system (DSS). In particular, FIG. 1 may comprise a portion of the MicroStrategy 7 or 7.1 platform which provides a preferred system in which the present invention may be implemented.

In general, through using the system 100 of the invention, analysts, managers and other users may query or interrogate a plurality of databases or database arrays to extract demographic, sales, and/or financial data and information and other patterns from records stored in such databases or database arrays to identify strategic trends. Those strategic trends may not be discernable without processing the queries and treating the results of the data extraction according to the techniques performed by the systems and methods of the invention. This is in part because the size and complexity of some data portfolios stored in such databases or database arrays may mask those trends.

In addition, system 100 may enable the creation of reports or services that are processed according to a schedule. Users may then subscribe to the service, provide personalization criteria and have the information automatically delivered to the user, as described in U.S. Pat. No. 6,154,766 to Yost et al., which is commonly assigned and hereby incorporated by reference.

As illustrated in FIG. 1, a business, a government or another user may access the resources of the system 100 using a user engine 102. The user engine 102 may include a query input module 116 to accept a plurality of searches, queries or other requests, via a query box on a graphical user interface (GUI) or another similar interface. The user engine 102 may communicate with an analytical engine 104. The analytical engine 104 may include a set of extensible modules to run a plurality of statistical analyses, to apply filtering criteria, to perform a neural net technique or another technique to condition and treat data extracted from data resources hosted in the system 100, according to a query received from the user engine 102.

The analytical engine 104 may communicate with a query engine 106, which in turn interfaces to one or more data storage devices 108a, 108b . . . 108n (where n is an arbitrary number). The data storage devices 108a, 108b . . . 108n may include or interface to a relational database or another structured database stored on a hard disk, an optical disk, a solid state device or another similar storage media. When implemented as databases, the data storage devices 108a, 108b . . . 108n may include or interface to, for example, an Oracle™ relational database such as sold commercially by Oracle Corporation, an Informix™ database, a Database 2 (DB2) database, a Sybase™ database, or another data storage device or query format, platform or resource such as an OLAP format, a Standard Query Language (SQL) format, a storage area network (SAN), or a Microsoft Access™ database. It should be understood that while data storage devices 108a, 108b . . . 108n are illustrated as a plurality of data storage devices, in some embodiments the data storage devices may be contained within a single database or another single resource.

Any of the user engine 102, the analytical engine 104 and the query engine 106 or other resources of the system 100 may include or interface to or be supported by computing resources, such as one or more associated servers. When a server is employed for support, the server may include, for instance, a workstation running a Microsoft Windows™ NT™ operating system, a Windows™ 2000 operating system, a Unix operating system, a Linux operating system, a Xenix operating system, an IBM AIX™ operating system, a Hewlett-Packard UX™ operating system, a Novell Netware™ operating system, a Sun Microsystems Solaris™ operating system, an OS/2™ operating system, a BeOS™ operating system, a Macintosh operating system, an Apache platform, an OpenStep™ operating system, or another similar operating system or platform. According to one embodiment of the present invention, analytical engine 104 and query engine 106 may comprise elements of an intelligence server 103.

The data storage devices 108a, 108b . . . 108n may be supported by a server or another resource and may, in some embodiments, include redundancy, such as a redundant array of independent disks (RAID), for data protection. The storage capacity of any one or more of the data storage devices 108a, 108*b* . . . 108*n* may be of various sizes, from relatively small data sets to very large database (VLDB)-scale data sets, such as warehouses holding terabytes of data or more. The fields and types of data stored within the data storage devices 108*a*, 108*b* . . . 108*n* may also be diverse, and may include, for instance, financial, personal, news, marketing, technical, addressing, governmental, military, medical or other categories of data or information.

The query engine 106 may mediate one or more queries or information requests from those received from the user at the user engine 102 to parse, filter, format and otherwise process such queries to be submitted against the data contained in the data storage devices 108*a*, 108*b* . . . 108*n*. Thus, a user at the user engine 102 may submit a query requesting information in SQL format, or have the query translated to SQL format. The submitted query is then transmitted via the analytical engine 104 to the query engine 106. The query engine 106 may determine, for instance, whether the transmitted query may be processed by one or more resources of the data storage devices 108*a*, 108*b* . . . 108*n* in its original format. If so, the query engine 106 may directly transmit the query to one or more of the resources of the data storage devices 108*a*, 108*b* . . . 108*n* for processing.

If the transmitted query cannot be processed in its original format, the query engine 106 may perform a translation of the query from an original syntax to a syntax compatible with one or more of the data storage devices 108*a*, 108*b* . . . 108*n* by invoking a syntax module 118 to conform the syntax of the query to standard SQL, DB2, Informix™, Sybase™ formats or to other data structures, syntax or logic. The query engine 106 may likewise parse the transmitted query to determine whether it includes any invalid formatting or to trap other errors included in the transmitted query, such as a request for sales data for a future year or other similar types of errors. Upon detecting an invalid or an unsupported query, the query engine 106 may pass an error message back to the user engine 102 to await further user input.

When a valid query such as a search request is received and conformed to a proper format, the query engine 106 may pass the query to one or more of the data storage devices 108*a*, 108*n* . . . 108*n* for processing. In some embodiments, the query may be processed for one or more hits against one or more databases in the data storage devices 108*a*, 108*b* . . . 108*n*. For example, a manager of a restaurant chain, a retail vendor or another similar user may submit a query to view gross sales made by the restaurant chain or retail vendor in the State of New York for the year 1999. The data storage devices 108*a*, 108*b* . . . 108*n* may be searched for one or more fields corresponding to the query to generate a set of results 114.

Although illustrated in connection with each data storage device 108 in FIG. 1, the results 114 may be generated from querying any one or more of the databases of the data storage devices 108*a*, 108*b* . . . 108*n*, depending on which of the data resources produce hits from processing the search query. In some embodiments of the system 100 of the invention, the results 114 may be maintained on one or more of the data storage devices 108*a*, 108*b* . . . 108*n* to permit one or more refinements, iterated queries, joinders or other operations to be performed on the data included in the results 114 before passing the information included in the results 114 back to the analytical engine 104 and other elements of the system 100.

When any such refinements or other operations are concluded, the results 114 may be transmitted to the analytical engine 104 via the query engine 106. The analytical engine 104 may then perform statistical, logical or other operations on the results 114 for presentation to the user. For instance, the user may submit a query asking which of its retail stores in the State of New York reached $1M in sales at the earliest time in the year 1999. Or, the user may submit a query asking for an average, a mean and a standard deviation of an account balance on a portfolio of credit or other accounts.

The analytical engine 104 may process such queries to generate a quantitative report 110, which may include a table or other output indicating the results 114 extracted from the data storage devices 108*a*, 108*b* . . . 108*n*. The report 110 may be presented to the user via the user engine 102, and, in some embodiments, may be temporarily or permanently stored on the user engine 102, a client machine or elsewhere, or printed or otherwise output. In some embodiments of the system 100 of the invention, the report 110 or other output may be transmitted to a transmission facility 112, for transmission to a set of personnel via an email, an instant message, a text-to-voice message, a video or via another channel or medium. The transmission facility 112 may include or interface to, for example, a personalized broadcast platform or service such as the Narrowcaster™ platform or Telecaster™ service sold by MicroStrategy Incorporated or another similar communications channel or medium. Similarly, in some embodiments of the invention, more than one user engine 102 or other client resource may permit multiple users to view the report 110, such as, for instance, via a corporate intranet or over the Internet using a Web browser. Various authorization and access protocols may be employed for security purposes to vary the access permitted users to such report 110 in such embodiments.

Additionally, as described in the '766 patent, an administrative level user may create a report as part of a service. Subscribers/users may then receive access to reports through various types of data delivery devices including telephones, pagers, PDAs, WAP protocol devices, email, facsimile, and many others. In addition, subscribers may specify trigger conditions so that the subscriber receives a report only when that condition has been satisfied, as described in detail in the '766 patent. The platform of FIG. 1 may have many other uses, as described in detail with respect to the MicroStrategy 7 and 7.1 platform, the details of which will be appreciated by one of ordinary skill in the reporting and decision support system art.

The steps performed in a method 200 for processing data according to the invention are illustrated in the flowchart of FIG. 2. In step 202, the method 200 begins. In step 204, the user may supply input, such as a query or a request for information, via the user engine 102. In step 206, the user input query may be preliminarily processed, for instance, to determine whether it includes valid fields and for other formatting and error-flagging issues. In step 208, any error conditions may be trapped and an error message presented to the user, for correction of the error conditions. In step 210, if a query is in a valid format, the query may then be transmitted to the analytical engine 104.

In step 212, the analytical engine 104 may further process the input query as appropriate to ensure the intended results 114 may be generated to apply the desired analytics. In step 214, the query engine 106 may further filter, format and otherwise process the input query to ensure that the query is in a syntax compatible with the syntax of the data storage devices 108*a*, 108*b* . . . 108*n*. In step 216, one or more appropriate databases or other resources within the data storage devices 108*a*, 108*b* . . . 108*n* may be identified to be accessed for the given query.

In step 218, the query may be transmitted to the data storage devices 108*a*, 108*b* . . . 108*n* and the query may be processed for hits or other results 114 against the content of the data storage devices 108*a*, 108*b* . . . 108*n*. In step 220, the results 114 of the query may be refined, and intermediate or other corresponding results 114 may be stored in the data storage devices 108a, 108b . . . 108n. In step 222, the final results 114 of the processing of the query against the data storage devices 108a, 108b . . . 108n may be transmitted to the analytical engine 104 via the query engine 106. In step 224, a plurality of analytical measures, filters, thresholds, statistical or other treatments may be run on the results 114. In step 226, a report 110 may be generated. The report 110, or other output of the analytic or other processing steps, may be presented to the user via the user engine 102. In step 228, the method 200 ends.

Figure 3:
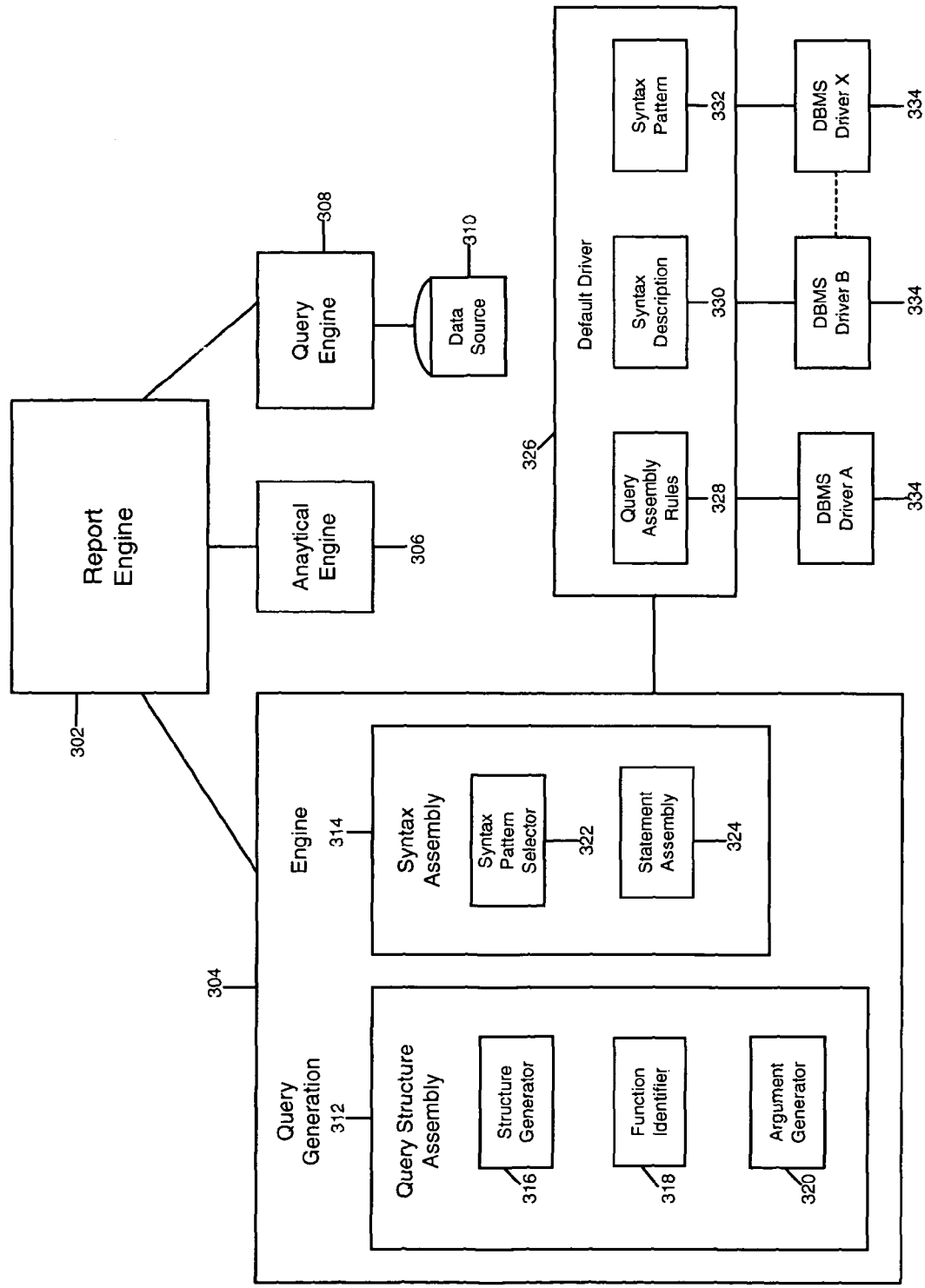
FIG. 3 is a block diagram illustrating an architecture for a system according to an embodiment of the invention.

In an embodiment of the invention illustrated in FIG. 3, a system 300 for data retrieval and processing is shown. The system 300 may be a portion of an OLAP system, such as an OLAP embodiment of the system 100 from FIG. 1, above. The system 300 includes a report engine 302, a query generation engine 304, an analytical engine 306, and a query engine 308 for retrieving data from a data source 310. In the embodiment shown, the report engine 302 may control the collaborative workflow among query language engine 304, analytical engine 306, and query engine 308. The report engine 302 may identify a data set desired for a particular report or set of reports and communicates the parameters of the data set to the query generation engine 304. The query generation engine 304 may be responsible for generating a query structure and query language statements capable of retrieving and processing the desired data set. The analytical engine 306 provides processing, such as calculations and transformations (e.g., analytical calculations, subtotal calculations, pivoting, etc.), which is preferably not performed at the database level. The query engine 308 may send one or more query language statements to the data source 310 for processing, generally via a DBMS. The query engine 308 also receives the result set from the data source 310. In one embodiment, the report engine 302 may coordinate multiple passes and data exchanges among the query generation engine 304, the analytical engine 306, and the query engine 308 in order to efficiently utilize the processing resources of the OLAP system and the DBMS for a complex data set. Data source 310 may be any type of data source, such as a database, data mart, data warehouse, or other data source. The data source 310 may include multiple data sources.

The query generation engine 304 may include a number of modules for generating a query execution plan and related query structure and query language statements. In the embodiment shown, the query generation engine 304 includes a query structure assembly module 312 and a syntax assembly module 314. The query structure assembly module 312 may generate a query structure (e.g., a logic tree) identifying data retrieval and processing to be done against the data source 310 and processing to be done by the analytical engine 306. The query structure assembly module 312 may be responsible for parsing data set parameters and identifying functions and argument data sets to define nodes in the query structure. The syntax assembly module 314 generates query language statements for retrieving data, with or without data source processing, from the data source 310. The syntax assembly module 314 may also generate query language statements for processing to be done by the analytical engine 306. In one embodiment, the query assembly module 312 and the syntax assembly module 314 may include one or more process optimization features. These features may be incorporated into the logic applied by the query structure assembly module and the syntax assembly module. For example, evaluations of base table selection, evaluation of intermediate data handling, and evaluation of join paths may be incorporated into the query assembly module 312 and the syntax assembly module 314.

In one embodiment, the query structure assembly module 312 and the syntax assembly module 314 may utilize a set of query assembly rules, syntax descriptions, and syntax patterns to evaluate the desired data set and generate the query execution plan. The query assembly rules, syntax descriptions, and syntax patterns may incorporate basic logic, such as lookup tables, dependencies, and conditions, for parsing the parameters of the desired data set to generate the query structure and query language statements. The query assembly rules, syntax descriptions, and syntax patterns may be based upon identification of the data set parameters and a database schema associated with the data source 310. The query assembly rules, syntax descriptions, and syntax patterns may also incorporate information about the data source (e.g., table sizes, relationships among aggregate/abstracted/transformed data, data gaps, etc.), information about a report or set of reports (e.g., repeated calculations, metrics, drilling patterns, pivots, etc.), information regarding VLDBs, and other information. The query assembly rules, syntax descriptions, and syntax patterns may incorporate logic and syntax based upon the query language, enhanced functions, definitions, limitations, shortcuts, and optimizations present in various DBMS.

The query structure assembly module 312 may include a plurality of modules for generating the query execution plan. In one embodiment, the query structure assembly module 312 may include a structure generator module 316, a function identifier module 318, and an argument generator module 320. The structure generator module 316 may generate a query structure based upon the desired data set to be generated by the query execution plan. The function identifier module 318 may identify a functional element from the query structure to provide a basis for a query language statement. The argument generator module 320 may identify an argument data set corresponding to the parameters of the desired data set. The structure generator module 316, the function identifier module 318, and the argument generator module 320 may operate simultaneously, sequentially, or iteratively to parse the parameters of the desired data set. Operation of the structure generator module 316, the function identifier module 318, and the argument generator module 320 may produce a multi-level query structure including multiple functions to be carried out at both the data source level and by the analytical engine 306. Each function may correspond to one or more functional modules. The argument generator module 320 may create one or more argument data sets corresponding to a functional element or group of functional elements.

In one embodiment, the structure generator module 316 creates a tree query structure for returning the desired data set from a data source. The query structure may describe a series of functions, including queries, table creation, processing steps, and other functions, that will generate the desired data set. The query structure may include intermediate queries, queries against multiple data sources, calculations to be carried out by the analytical engine 306, DBMS specific functions, and other functions. The query structure may include a non-linear execution pattern. The execution pattern may include conditional statements, error handling, parallel processing threads (such as simultaneous queries to different data sources), and other features. Generation of the query structure may be based on an algorithm that evaluates the desired data set. The desired data set may be the set of results fulfilling the user requirements of a particular report. The desired data set may be represented by a number of parameters specifying information such as the types, formats, and ranges of data desired. The structure generator may base the generation of the query structure upon the evaluation of query assembly rules. The query assembly rules may, in turn, be based upon evaluation of the parameters associated with the desired data set, the schema of the data source (or the schemas of multiple data sources where multiple data sources are available), the available functions, and other information.

In one embodiment, the function identifier module 318 identifies one or more functions for the query structure and associates them with a functional component capable of executing the one or more functions. An example single function functional component might include selecting a particular body of data from a particular table. An example multi-function functional component might include selecting a particular body of data and returning averages of that data. Functional components may represent a function or group of functions that can be reduced to a single query language statement. A given functional component may be associated with one or more syntax patterns for generating a query language statement to execute the function or functions. Some example functional components are Create Table, Create Index, Create View, Drop Table, Drop View, Select Data, Insert Data, Delete Data, Update Data, etc. Functional components may be more or less specific depending on the level of syntax abstraction desired. For example, Create Temporary Table, Create Permanent Table, Create Temporary Implicit Table, etc. The function identifier module 318 may also identify one or more selection variables associated with one or more functional components. The selection variables assist in evaluating a plurality of available syntax patterns where appropriate. In one embodiment, an identifier corresponding to the DBMS (or version thereof) of each data source is provided as a selection variable. Other selection variables may include explicit/implicit settings, permanent/temporary settings, and other settings. In one embodiment, syntax descriptions may be used to identify functional components corresponding to one or more functions.

In one embodiment, the argument generator module 320 generates an argument vector that may be a set of argument data to be applied to one or more syntax patterns. The argument vector includes one or more discrete parameter data elements positioned in a list according to parameter type. Parameter type designates the function the data element will perform in the finished query language statement. For example, one or more syntax patterns may include a table name, a table descriptor, and other parameter types. However, each syntax pattern may place these parameters in different locations and with different connective statements, punctuation, etc. By placing the argument data in a vector arranged by parameter type, the data in the argument vector may be applied across multiple syntax patterns. In one embodiment, a parameter key may be supplied for associating position in the vector with a particular parameter type. The argument vector may be generic to a plurality of syntax patterns. The argument vector may be associated with a particular functional component or may be generic across multiple functional components. The order of the argument vector may be derived from a syntax description associated with the functional component. Query assembly rules may provide logic for associating parameters from the desired data set with parameter types in the argument vector. In one embodiment, selection variables may be included in the argument vector. An example parameter key might be (0, table name) (1, columns) (2, post table index string). The corresponding argument data set might be ("zipcodetable", "zipcode, city, state", "0").

The syntax assembly module 314 may include a plurality of modules for generating one or more query language statements based upon the query execution plan. In one embodiment, the syntax assembly module 314 may include a syntax pattern selector module 322 and a statement assembly module 324. The syntax pattern selector module 322 may select a syntax pattern from among a plurality of syntax patterns based upon one or more selection criteria. The statement assembly module 324 populates the selected syntax pattern with an argument data set corresponding to parameters for returning the desired data set. The syntax pattern selector 322 and the statement assembly module 324 may operate in conjunction with the structure generator module 316, the function identifier module 318, and the argument generator module 320 simultaneously, sequentially, or iteratively to convert the parsed parameters of the desired data set into query language statements. The query language statements generated may be run against the data source. The query language statements may also include statements to be run in conjunction with the analytical engine 306. The query language statements generated may be executable as generated or may be combined into aggregate statements or other executable code.

In one embodiment, the syntax pattern selector module 322 selects a syntax pattern from a group of syntax patterns associated with a functional element. The functional element may define a default syntax pattern. An example default syntax pattern for a create table functional element is "create table #0#1 #2;" where #0, #1, and #2 represent insertion points for parameters selected from the argument data set. The "create table" portion is a fixed syntax statement and the ";" is syntax punctuation. Additional syntax patterns associated with the functional element may include syntax patterns associated with DBMS specific syntax or optimizations. An alternate syntax pattern might be "create #1 as #0 table;" Note that parameter #2 would not be used in this syntax pattern and the order of the first two parameters would be inverted. Selection of one of the additional syntax patterns may be based upon evaluating one or more selection variables, such as a DBMS identifier or other selection variables. Additional factors, other than selection variables, may be evaluated to determine the syntax pattern selected.

In one embodiment, the statement assembly module 324 populates the selected syntax pattern with data from the argument data set in the defined insertion point. For example, the example argument vector, above, inserted into the two example syntax statements would create "create table zipcodetable zipcode, city, state 0;" and "create zipcode, city, state as zipcodetable table;" respectively. The insertion logic may include simple insertion or may include more complex processing.

In one embodiment, a default driver module 326 may provide default query assembly rules 328, syntax descriptions 330, and syntax patterns 332 for the query generation engine 304. In one embodiment, the query assembly rules 328, the syntax descriptions 330, and the syntax patterns 332 may be based upon the most uniformly accepted available features, syntax, and optimizations for the DBMS with which the system may interface. The default driver module may supplement query assembly rules, syntax descriptions, and syntax patterns in the query generation engine 304. In one embodiment, the drivers are separable components from the query generation engine 304 (e.g., a separate file or code object), such that they may be interchanged or modified without altering or causing recompilation of the query generation engine 304. The drivers may include both a compiled code object and one or more external data files to facilitate modification of the drivers without recompiling the code object. In the embodiment shown, a number of additional drivers 334 (DBMS driver A, DBMS driver B ... DBMS driver x) corresponding to specific DBMS (or versions of DBMS) are available to the query generation engine 304. For example, DBMS driver A may correspond to Oracle™ query syntax and optimization and DBMS driver B may correspond to Sybase™ query syntax and optimization. The number of additional drivers 334 may include correct syntax for the supported DBMS and optimal query language and structure for the supported DBMS. The optimizations may include decisions made during the parsing of the data set and during the generation of the query language statements. In one embodiment, all parsing and query language statement generation that is not generally applicable across all supported DBMS may be handled by the number of additional drivers 334. The number of additional drivers 334 may each include query assembly rules, syntax descriptions, and syntax patterns in addition to those shown for default driver 326.

Figure 4:
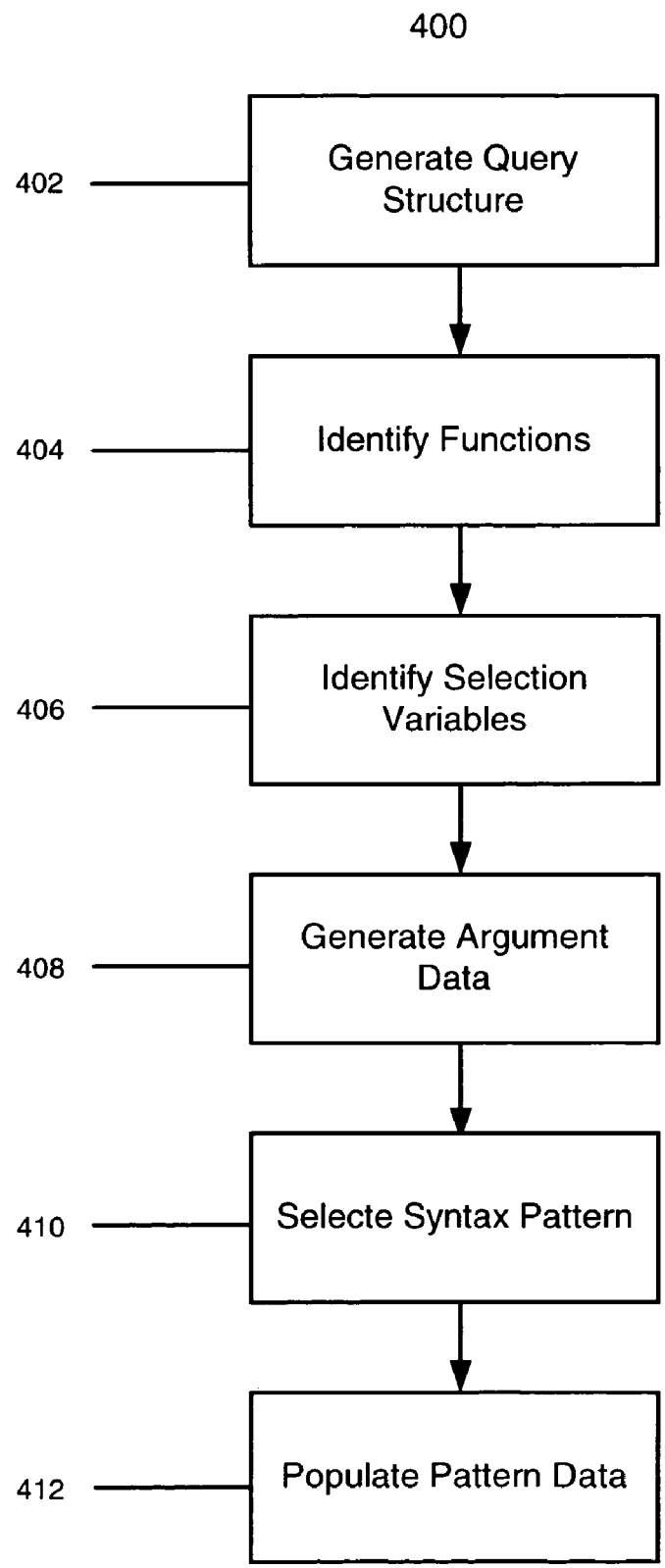
FIG. 4 is a flowchart illustrating a method of generating a query language statement according to an embodiment of the invention.

In an embodiment of the invention illustrated in FIG. 4, a method 400 for generating query language statement is shown. The method 400 may be used to generate a plurality of query language statements corresponding to portions of a query structure for implementing a query execution plan. In one embodiment, the method 400 may be implemented by an embodiment of the system 300 shown in FIG. 3. In step 402, a query structure is generated to define the basic steps in the query generation plan. In step 404, one or more functional elements within the query structure are identified. In step 406, one or more selection variables for selection of a syntax pattern are identified. In step 408, one or more argument data sets are generated based upon one or more functional elements and the desired data set In step 410, a syntax pattern is selected corresponding to the functional element and a syntax standard. Any identified selection variables may also be evaluated for selecting the syntax pattern. In step 412, the selected syntax pattern is populated using the argument data set. The argument data set may be mapped to is positions within the selected syntax pattern to generate one or more query language statements. The query language statements may be executed against a data source to return a desired data set.

Other embodiments and uses of the invention will be apparent to those skilled in the art from consideration of the specification and practice of the invention disclosed herein. The specification and examples should be considered exemplary only. The scope of the invention is only limited by the claims appended hereto.

What is claimed is:

1. A computer-implemented system comprises at least a programmed computer processor for automated generation of one or more query language statements, the computer implemented system comprising:
   a syntax pattern selector module using the programmed computer processor for selecting, in an automated process, a syntax pattern corresponding to a desired function defining a default syntax pattern provided to the syntax pattern selector module and a syntax standard for use in generating the one or more query language statements;
   a statement assembly module using the programmed computer processor for populating the syntax pattern, in the automated process with an argument data set associated with parameters that specify information of a desired data set and the desired function provided to the statement assembly module as part of the process of generating the one or more query language statements, wherein the arguments data are arranged in a vector associated with a functional component by parameter type and mapped to plurality of positions within the syntax pattern to generate the one or more query language statements; and
   whereby at least one query language statement having a tree query structure generated based at least in part on the parameters that specify information of the desired data set is assembled to be run against a data source to return the desired data set.

2. The computer-implemented system of claim 1, wherein the syntax pattern selector module selects the syntax pattern from a plurality of syntax patterns corresponding to a plurality of database management systems.

3. The computer-implemented system of claim 1, wherein the syntax pattern selector module selects the syntax pattern from a plurality of syntax patterns based upon at least one selection variable.

4. The computer-implemented system of claim 1, wherein the system is a component in an online analytical processing system, a reporting system, a business intelligence system, or a data mining system.

5. The computer-implemented system of claim 1, further comprising a plurality of driver modules, each of the driver modules including at least one syntax pattern associated with a selected database management system.

6. A computer-implemented system comprises at least a programmed computer processor for generating one or more query language statements, the computer implemented system comprising:
   a syntax pattern selector module using the programmed computer processor for selecting a syntax pattern corresponding to a desired function defining a default syntax pattern, and a syntax standard;
   a statement assembly module using the programmed computer processor for populating the syntax pattern with an argument data set associated with parameters that specify information of a desired data set and the desired function, wherein the arguments data are arranged in a vector associated with a functional component by parameter type and mapped to plurality of positions within the syntax pattern to generate the one or more query language statements; a structure generator module using the programmed computer processor for generating a query structure based on the desired data set, the query structure providing a basis for identifying the desired function to be used by the syntax pattern selector module; and
   whereby at least one query language statement having a tree query structure generated based at least in part on the parameters that specify information of the desired data set is assembled to be run against a data source to return the desired data set.

7. A computer-implemented system comprises at least a programmed computer processor for generating one or more query language statements, the computer implemented system comprising:
   a syntax pattern selector module using the programmed computer processor for selecting a syntax pattern corresponding to a desired function defining a default syntax pattern, and a syntax standard;
   a statement assembly module using the programmed computer processor for populating the syntax pattern with an argument data set associated with parameters that specify information of a desired data set and the desired function, wherein the arguments data are arranged in a vector associated with a functional component by parameter type and mapped to plurality of positions within the syntax pattern to generate the one or more query language statements; a function identifier module using the programmed computer processor for identifying a functional element corresponding to the desired function and at least one syntax pattern; and whereby at least one query language statement having a tree query structure generated based at least in part on the parameters that specify information of the desired data set is assembled to be run against a data source to return the desired data set.

8. A computer-implemented system comprises at least a programmed computer processor for generating one or more query language statements, the computer implemented system comprising:

a syntax pattern selector module using the programmed computer processor for selecting a syntax pattern corresponding to a desired function defining a default syntax pattern, and a syntax standard;

a statement assembly module using the programmed computer processor for populating the syntax pattern with an argument data set associated with parameters that specify information of a desired data set and the desired function, wherein the arguments data are arranged in a vector associated with a functional component by parameter type and mapped to plurality of positions within the syntax pattern to generate the one or more query language statements; an argument generator module using the programmed computer processor for identifying the argument data set associated with the desired data set; and whereby at least one query language statement having a tree query structure generated based at least in part on the parameters that specify information of the desired data set is assembled to be run against a data source to return the desired data set.

9. The computer-implemented system of claim 8, wherein the argument generator module identifies the argument data set based upon a syntax description associated with the desired function.

10. A computer-implemented method of generating one or more query language statements to be run against a one or more data sources, comprising the steps, performed by a computer system, of:

selecting a syntax pattern corresponding to a desired function defining a default syntax pattern, provided as an input and a syntax standard for use in generating the one or more query language statements;

populating the syntax pattern with an argument data set associated with parameters that specify information of a desired data set and the desired function provided as an input identifying the data set on which to operate from the data source as part of generating the one or more query language statements, wherein the arguments data are arranged in a vector associated with a functional component by parameter type and mapped to plurality of positions within the syntax pattern to generate the one or more query language statements; and wherein, the populated syntax pattern is used to generate one or more query language statements having a tree query structure generated based at least in part on the parameters that specify information of the desired data set runnable against one or more data sources to return the desired data result set.

11. The computer-implemented method of claim 10, wherein the step of selecting the syntax pattern includes selecting the syntax pattern from a plurality of syntax patterns corresponding to a plurality of database management systems.

12. The computer-implemented method of claim 10, wherein the step of selecting the syntax pattern includes selecting the syntax pattern from a plurality of syntax patterns based upon at least one selection variable.

13. The computer-implemented method of claim 10, further comprising the step of generating a query structure based on the desired data set, the query structure providing a basis for identifying the desired function to be used in selecting the syntax pattern.

14. The computer-implemented method of claim 10, further comprising the step of identifying at least one selection variable for selecting the syntax pattern from a plurality of syntax patterns.

15. The method of claim 10, wherein the method is executed in an online analytical processing systems, a reporting system, a business intelligence system, or a data mining system.

16. The method of claim 10, wherein the step of selecting the syntax pattern includes accessing a plurality of driver modules including at least one syntax pattern, each of the plurality of driver modules corresponding to a selected database management system.

17. A method of generating one or more query language statements to be run against a one or more data sources, comprising the steps of:

selecting a syntax pattern corresponding to a desired function defining a default syntax pattern, and a syntax standard;

populating the syntax pattern with an argument data set associated with parameters that specify information of a desired data set from the data source and the desired function, wherein the arguments data are arranged in a vector associated with a functional component by parameter type and mapped to plurality of positions within the syntax pattern to generate the one or more query language statements;

identifying a functional element corresponding to the desired function and at least one syntax pattern, the functional element providing a basis for selecting the syntax pattern; and wherein, the populated syntax pattern comprises one or more query language statements having a tree query structure generated based at least in part on the parameters that specify information of the desired data set runnable against one or more data sources to return the desired data result set.

18. A method of generating one or more query language statements to be run against a one or more data sources, comprising the steps of:

selecting a syntax pattern corresponding to a desired function defining a default syntax pattern, and a syntax standard;

populating the syntax pattern with an argument data set associated with parameters that specify information of a desired data set from the data source and the desired function, wherein the arguments data are arranged in a vector associated with a functional component by parameter type and mapped to plurality of positions within the default syntax pattern to generate the one or more query language statements;

identifying the argument data set associated with the desired data set; and wherein, the populated syntax pattern comprises one or more query language statements having a tree query structure generated based at least in part on the parameters that specify information of the desired data set runnable against one or more data sources to return the desired data result set.

19. The method of claim 18, wherein the step of identifying the argument data set includes identifying the argument data set based upon a syntax description associated with the desired function.

20. A tangible medium having a computer readable program code embodied therein for generating one or more query language statements through an automated computer-implemented method comprising:
   code for causing the processor to identify a functional element corresponding to a desired function for use in generating the one or more query language statements, wherein the functional element defines a default syntax pattern;
   code for causing the processor to identify an arguments data are arranged in a vector associated with a functional component by parameter type and mapped to plurality of positions within the syntax pattern to generate the one or more query language statements, wherein the argument data set is mapped to positions within the default syntax pattern to generate the one or more query language statements;
   code for causing the processor to select a syntax pattern corresponding to the functional element; and code for causing the processor to populate the selected syntax pattern with the identified argument data set to assemble at least one query language statement having a tree query structure generated based at least in part on the parameters that specify information of the desired data set to be run against a data source to return the desired data set.

21. A method of generating a query language statement from computer code embodied on a computer readable media comprising the steps of:
   defining a syntax pattern accessible to a system for generating a query language statement having a tree query structure generated based at least in part on the parameters that specify information of the desired data set;
   accessing the defined syntax pattern from the system to generate the query language statement; wherein arguments data are arranged in a vector associated with a functional component by parameter type and mapped to plurality of positions within the syntax pattern to generate the one or more query language statements
   and wherein the system does not need to be recompiled as a result of defining the syntax pattern.

22. The method of claim 21, wherein the syntax pattern is associated with a selected database management system.

23. A tangible medium having a computer readable program code embodied therein for generating one or more query language statements comprising:
   code for causing the processor to identify a functional element corresponding to a desired function, wherein the functional element defines a default syntax pattern;
   code for causing the processor to identify an argument data set associated with parameters that specify information of a desired data set and the identified functional element, wherein the arguments data are arranged in a vector associated with a functional component by parameter type and mapped to plurality of positions within the syntax pattern to generate the one or more query language statements;
   code for causing the processor to select a syntax pattern corresponding to the functional element; code for identifying a functional element corresponding to the desired function and at least one syntax pattern, the functional element providing a basis for selecting the syntax pattern; and
   code for causing the processor to populate the selected syntax pattern with the identified argument data set to assemble at/east one query language statement having a tree query structure generated based at least in part on the parameters that specify information of the desired data set to be run against a data source to return the desired data set.

24. A tangible medium having a computer readable program code embodied therein for generating one or more query language statements comprising:
   code for causing the processor to identify a functional element corresponding to a desired function, wherein the functional element defines a default syntax pattern;
   code for causing the processor to identify an argument data set associated with parameters that specify/information of a desired data set and the identified functional element wherein the arguments data are arranged in a vector associated with a functional component by parameter type and mapped to plurality of positions within the syntax pattern to generate the one or more query language statements;
   code for causing the processor to select a syntax pattern corresponding to the functional element; code for identifying the argument data set associated with the desired data set; and code for causing the processor to populate the selected syntax pattern with the identified argument data set to assemble at least one query language statement having a tree query structure generated based at least in part on the parameters that specify information of the desired data set to be run against a data source to return the desired data set.

* * * * *